United States Patent [19]

Fisher

[11] Patent Number: 4,674,188

[45] Date of Patent: Jun. 23, 1987

[54] PLUMB BAR

[76] Inventor: Christopher J. Fisher, Rte. 1, Box 193, Aldie, Va. 22001

[21] Appl. No.: 755,450

[22] Filed: Jul. 16, 1985

[51] Int. Cl.⁴ ............................................. G01C 15/00
[52] U.S. Cl. ...................................... 33/1 H; 33/286; 33/290; 33/392; 33/DIG. 21; 33/464
[58] Field of Search ................ 33/1 H, 393, 463, 392, 33/413, 419, 464, 484, 286, 290, 342, 354, DIG. 21

[56] References Cited

U.S. PATENT DOCUMENTS 1,623,117  4/1927  Holland ................................ 33/464
2,475,745  7/1949  Humlegard ...................... 33/393 X
3,279,070  10/1966  Blount et al. .................... 33/1 H X
3,591,926  7/1971  Trice, Jr. ......................... 33/1 H X
4,319,402  3/1982  Martin ................................. 33/392

Primary Examiner—William D. Martin, Jr.
Attorney, Agent, or Firm—Stevens, Davis, Miller & Mosher

[57] ABSTRACT

A bar for temporarily securing to the housing of a construction laser so as to be able to measure accurately off to one side so that a plumb line can be established when there is an obstruction above the laser housing. The bar has means for a quick disconnect fitting on the handle of the laser.

4 Claims, 4 Drawing Figures

PLUMB BAR

BACKGROUND OF THE INVENTION

This invention pertains the field of underground construction, and more particularly to the use of construction lasers for alignment of underground structures, such as conduits. When such laser units are used, it is necessary to establish a plumb or vertical line directly above the laser unit. If there is no free vertical space above the laser, such as inside a manhole having an offset cover, then it is necessary to measure over to the laser from some arbitrary point, for example, by using a ruler, and thus inaccuracies in alignment can result.

SUMMARY OF THE INVENTION

In the present invention, a specially designed bar is temporarily secured to the top of the laser light alignment unit and projects perpendicularly outwardly therefrom. This bar has clearly marked calibrations on the top surface so that the degree of offset may be determined by sighting the top of the bar from a distant point, for example, from the ground level above a manhole having an offset cover.

DESCRIPTION OF THE PREFERRED EMBODIMENTS

In the field of underground construction, it is customary to use underground manholes into which a plurality of conduits, such as sewer pipes, are run. The underground conduits must be in proper alignment in order to ensure accurate flow of liquids therethrough. In modern day construction, this alignment is frequently done with a laser light generating unit, which is placed in the manhole at a position where the emitting light will be in alignment with the opening for an incoming conduit. At the same time, it is necessary to be able to project a line directly above that laser light so that surface construction, outside the manhole, can proceed along the line of the laser light. As long as the space vertically above the laser light generator is open, there is no problem in setting up proper equipment above it, such as a tripod stand, a transit and a plumb bob line hanging beneath the transit. The top of the laser light generating unit is usually clearly marked with an elongated center line, over which the plumb bob is aligned.

When the space vertically above the laser light generating unit is not open, then it is necessary to measure over from the previously-mentioned center line to a point where the plumb bob can be dropped. Such alignment requires at least two measurements and frequently requires a person to get in and out of the manhole at least twice in the process of making the measurements and ensuring proper alignment. Not only are such trips time-consuming, but also incur the danger that the laser unit will be bumped or pushed out of alignment in the process of getting in and out of the manhole.

Alternatively, it is possible to leave the construction of the manhole incomplete until all measurements have been taken or to remove part of a completed manhold in order to make the space vertically above the laser unit available for plumb alignment, all of which is time-consuming and expensive.

It is an object of the present invention to enable accurate plumb alignments to be made above a laser unit which does not have a vertically open area above it.

It is a further object of the present invention to avoid measurement errors in the process of aligning underground conduits.

These and other advantages will become apparent upon a review of the following description of a preferred embodiment, which is given by way of example and not of limitation, in which:

BRIEF DESCRIPTION OF THE DRAWINGS

FIG. 14 is a top plan view similar to FIG. 3, but showing the plumb bar of the present invention secured to the top handle of a laser light generating unit.

DETAILED DESCRIPTION OF THE PREFERRED EMBODIMENTS

Figure 1:
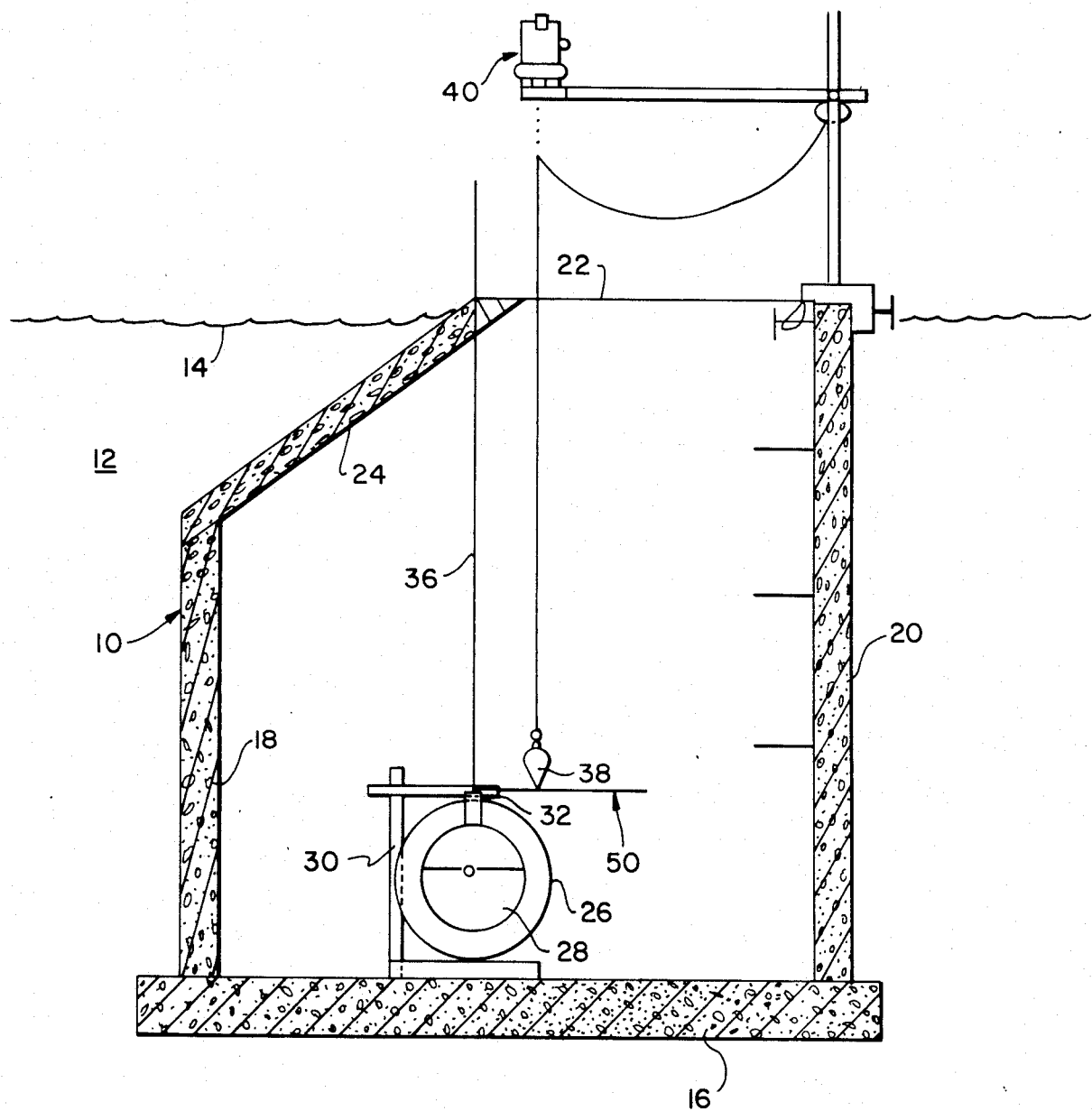
FIG. 1 is a vertical sectional view showing a manhole with an offset cover and a laser unit therein.

Turning now to the drawings in greater detail, in FIG. 1 there is shown a precast manhole base section 10 embedded in the earth 12 below the grade line 14. The manhole 10 has a concrete base 16, two parallel side walls 18 and 20, and a top opening 22, whose center is offset from the center between the side walls 18 and 20 with an angled top wall 24.

Inside the manhold 10 and spaced slightly above the base 16 is an opening 26 for an incoming conduit, having a laser light generating unit 28 held on an appropriate supporting stand 30 and positioned so as to project its laser light directly down the center of conduit 26. The laser light generating unit 28 has an elongated cylindrical body housing means for projecting a low power laser beam axially outwardly therefrom and carries an elongated top handle 32, which, in use, is directly in alignment with the projected center line of the conduit opening 26 and has a flat upper surface having a clearly inscribed alignment tongue or groove 34. This tongue or groove is in axial alignment with the laser beam.

In FIG. 1, if one were to draw a vertical line 36 directly upwardly from the handle center line 34, that line 36 would intersect manhold top slanted wall 24, and thus preclude use of a usual plumb bob 38 directly over alignment groove 34. As shown in FIG. 1, directly above plumb bob 38 is an alignment instrument 30, such as a transit, which is used for aligning a construction ditch running outwardly from manhole 10. It is essential that instrument 40 be placed either vertically above handle alignment groove 34 or that plumb bob 38 be a precisely known distance perpendicularly off to one side of groove 34. The usual practice is to climb down the manhole, measure over that distance, say off to the right, climb up the manhold and then measure a comparable distance off to the left of the plumb bob line so that the transit can then be placed directly above handle groove 34. Clearly, such a process is time consuming and inefficient and bears the distinct possibility of a mathematical error being made in measuring the amount of offset and then repeating the measurement.

Figure 2:
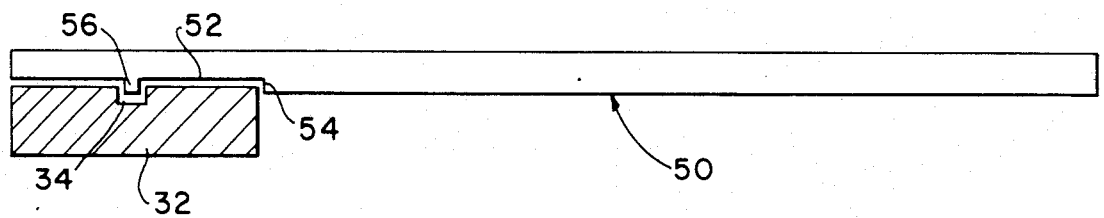
FIG. 2 is a side view of the plumb bar extension of the present invention.

FIG. 2 illustrates a preferred embodiment of the present invention and comprises an aluminum bar 50 made of heavy stock, for example, 1" wide, ¼" thick and 13" long. Adjacent one end of bar 50 is a recess portion 52, recessed to a depth 54 of approximately 1/16". The recess portion 52 has a tongue 56 projecting perpendicularly therefrom, this tongue being of a size and shape to permit entry and fitting into the groove 34 on the top of the laser handle. Alternatively, if a projecting tongue is used instead of groove 34, then the bar would carry a complementary groove to fit ovr the tongue.

Figure 4:
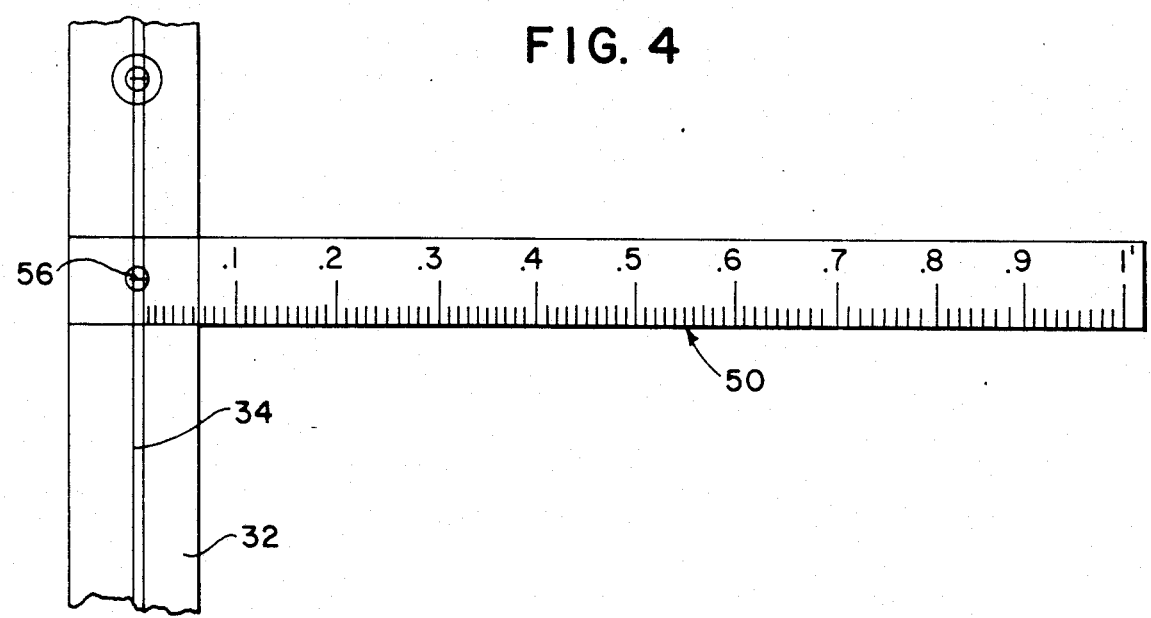

Thus, FIG. 4 depicts a portion the laser handle 32 with the plumb bar secured thereto. Preferably, there is a threaded hole in the handle 32 and the plumb bar 50 is secured thereto by inserting tongue 56 into groove 34 so that flat offset portion 52 overlies the flat upper surface of the handle 32 and the cutout portion 54 abuts the right edge of handle 32, as shown in FIG. 4. A suitable screw is then threaded into hole 56 in the corresponding threaded hole of the handle 32 directly therebelow. Thus, the offset portion 54 and the tongue 56 result in the plumb bar 50 being firmly and accurately secured so as to project perpendicularly from handle center line 34.

The above description is given to illustrate one means for accurately securing the plumb bar 50 to the laser top handle 32 so as to comply with statutory disclosure requirements. However, it is to be understood that other similar means are contemplated to be within the scope of this invention.

Figure 3:
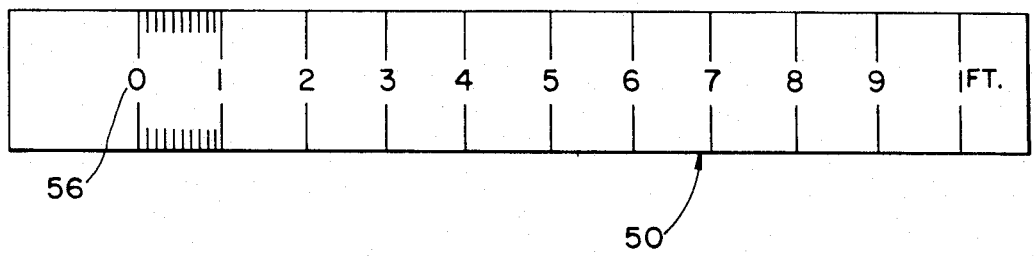
FIG. 3 is a top plan view of the plumb bar of the present invention.

The plumb bar is preferably marked, as indicated in FIG. 3, to show the number of inches and tenths of an inch away from hole 56, which, because it is in line with handle center line 34, represents the starting point. Although a particular preferred embodiment has been described herein, it should be understood that the scope of coverage is limited only by the following claims.

I claim:

1. A construction laser for use in a location where there is an obstacle vertically above the laser housing, comprising:
    an elongate housing having an alignment tongue or groove line on its top surface parallel to the axis of the laser light emitted therefrom, said alignment tongue or groove being for manual visual alignment of a plumb line extending downwardly toward said housing;
    a bar removeably secured to said housing and projecting generally perpendicular to said alignment tongue or groove line;
    said bar having a portion with a complementary shape for mating with the tongue or groove on the housing to hold the bar in said generally perpendicular projecting position; and
    means for releasably holding said bar in said generally perpendicular projecting position so that a plumb line may be manually aligned with said bar rather than said alignment tongue or groove line when there is an interfering obstacle vertically thereabove.

2. The construction laser of claim 1 in which the bar has a measuring scale on one surface thereof.

3. A construction laser for use in a location where there is an obstacle vertically above the laser housing, comprising:
    an elongate housing having a handle on its top surface parallel to the axis of the laser light emitting therefrom, said handle carrying an alignment tongue or groove line on an upper flat surface thereof for manual alignment of a plumb line extending downwardly toward said housing;
    a bar removably secured to said handle and projecting perpendicularly to said alignment line;
    said bar having a complementary tongue or groove for mating with the tongue or groove on the handle; and
    means for holding said bar in said perpendicular projecting position so that a plumb line may be manually aligned with said bar rather than said alignment tongue or groove line when there is a interfering obstacle vertically thereabove.

4. The construction laser of claim 3 in which a portion of said bar having said complementary tongue or groove is shaped to fit over the handle and interfit with at least one edge of the handle.

* * * * *